(12) United States Patent
Hedge

(10) Patent No.: X8780
(45) Date of Patent: Apr. 22, 1835

(54) WHITE & WHITING, PARIS

(76) Inventor: Lemuel Hedge

Peter Ferris- Greenwich Connecticut
Letters Patent, Dated April 22d 1835.

The schedule referred to in these Letters Patent and making part of the same containing a description in the words of the said Peter Ferris himself of his improvement in the art or mode of manufacturing Paris White and Whiting.

To all to whom these Presents shall come

Be it Known that I Peter Ferris of Greenwich in the County of Fairfield and State of Connecticut have invented a new and useful mode of manufacturing Paris White and Whiting and that the following is a full and exact description thereof. Discription first. Take a pair of Mill-stones Sopus or tight close Bur 4 feet 6 inches in diameter, divide the Stone into spaces of one foot each at the outside which will make 14, then make 14 furrows one inch wide at the outside of the Stone running to the eye 2 inches from the centre, make the furrows 3/8 of an inch deep at the outside the Stones and 1/8 of an inch at the eye, both Stones are to be divided and furrowed alike the running Stone must be opened 3/8 of an inch at the eye, diminishing 9 inches on the face; the remainder of the face of the Stone must be perfectly level and smooth. The bed Stone must be level and smooth from the eye to the outside. The Stone should revolve from 90 to an 100 times in a minute but no faster. The collars on the Spindle should be covered with sheet iron.

What I claim as my invention and not previously known in the above described mode of preparing Stones for grinding Paris White and Whiting is for the mode as I have described for the Stones to be laid out and furrowed, which by experience I find to be the mode in the manufacturing Paris White and Whiting.

Discription second. Paris White is made from clif Stone, the Stone is broke in small pieces and the flint carefully taken out, it is then spread to dry, from 2 to 4 weeks, then it can be ground as fine as common sand, then it is to be spread from 1 to 2 weeks to dry which when duly dried will grind perfectly fine, in the Stones described, in description first. Description third. Whiting is made from chalk. it is broken into small pieces and the flint taken out, it is then put into a furnace Kettle or Pot and dried by fire, which when duly dried, will grind perfectly fine, in the Stones described in description first. Chalk is more difficult to manufactor than clifstone and would be a long time in drying without fire - the Clifstone may also be dried by fire. Supplement - The advantages of my discovery in the manufacturing of Paris white and Whiting over the old way of grinding it in water, are, mine being perfectly dry, fine, and free from lumps, has all the necessary qualities for the reduction of White lead and other paints. And for white washing fine smooth walls in dwelling houses, it containing all the glutinous qualities, which are washed out by water grinding. My Whiting being dry and fine and free from lumps, it is much superior for working with oil into putty than that ground in water which is wet and lumpy, and requires much time to dry and hand labour to make fine. The Paris White and Whiting of my manufactory is worth from 10 to 25 per cent more than that ground in water. my invention for manufactoring Paris White and Whiting, can be performed at all seasons of the year, but the grinding in water cannot be done in cold weather Peter Ferris Witnesses { Benjamin Page
Daniel Lockwood (640 wds)

[illegible]
W.G.C.

Rec<sup></sup>d & Recorded anew May 1842. —

X8780

Missing page 521

Drawings of a

"Carpenter's Rule"

dated 4/22/1835 for Rules to my knowledge consist as follows. The common joint is composed of more or less pieces of metal which when placed together form a solid mass of the thickness of the Rule and is attached to the Box wood or other material composing the legs of the Rule by removing a portion of their thickness to receive the joint which diminishes their strength. This joint possesses little or no elasticity consequently as it wears it becomes loose. My improved joint is applied to the Rule without removing any of its thickness to receive it which is one of the principles I claim as my invention.

The manner of forming the joints of thin plates attached to the sides of the two legs, the intervening space being filled with the substance of the Rule itself instead of the more expensive mode of filling that space with metal is another principle I claim as my invention. My joint thus formed and applied possesses a degree of elasticity operating as a perpetual spring which prevents the joint from ever wearing loose.

[illegible] Witnesses — Samuel Hedge

[illegible] J. C. M. Clark

John Holland

[illegible] 615 wds

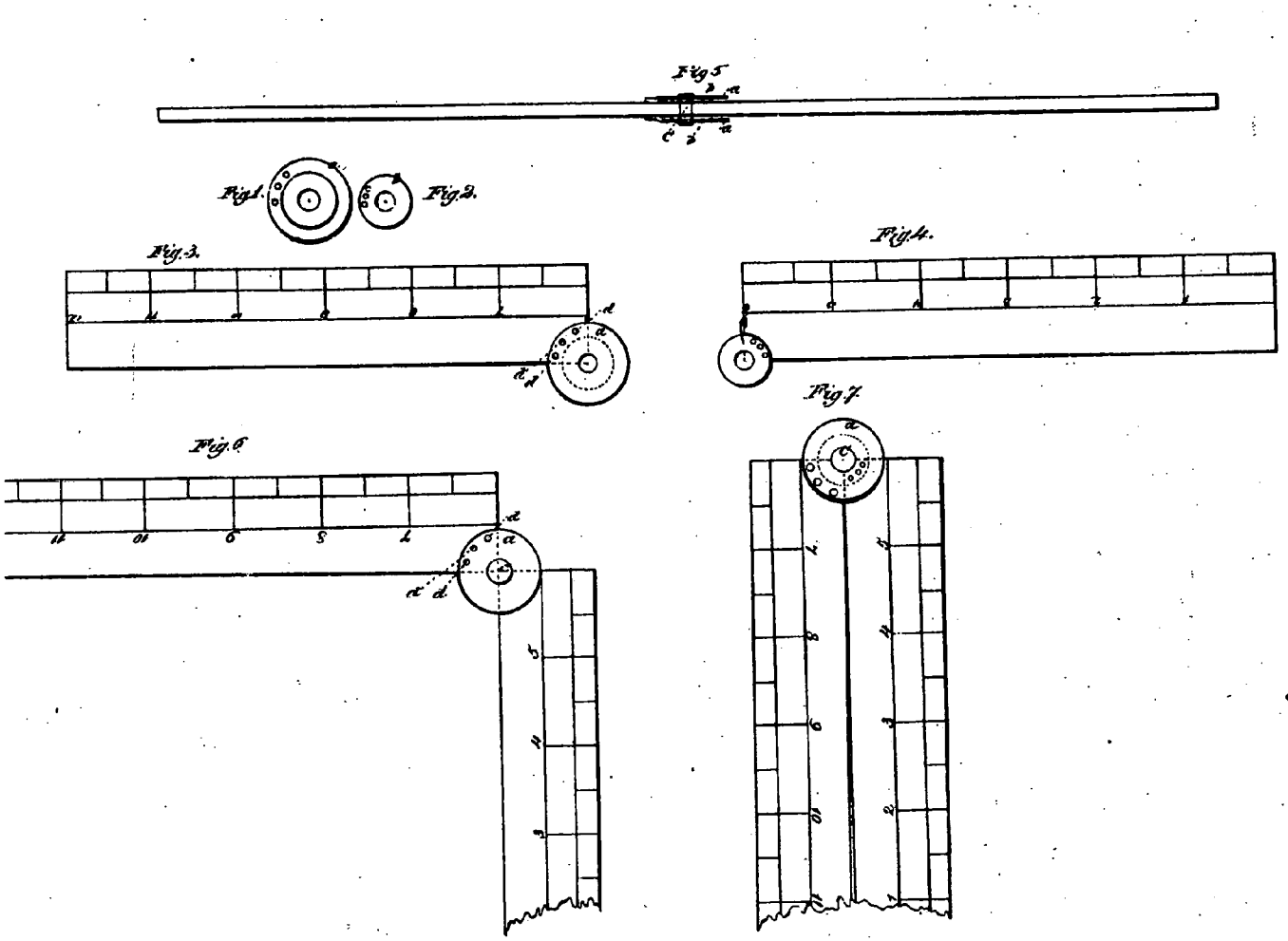

L. Hedge.
Carpenter's Rule.
No. Patented Apr. 22, 1835.